United States Patent
Hatano et al.

(10) Patent No.: US 10,462,214 B2
(45) Date of Patent: Oct. 29, 2019

(54) VISUALIZATION SYSTEM AND VISUALIZATION METHOD

(71) Applicant: NEC Corporation, Tokyo (JP)

(72) Inventors: Yoichi Hatano, Tokyo (JP); Hideyuki Shimonishi, Tokyo (JP); Kentaro Sonoda, Tokyo (JP); Masayuki Nakae, Tokyo (JP); Masaya Yamagata, Tokyo (JP); Yoichiro Morita, Tokyo (JP); Takayuki Sasaki, Tokyo (JP); Takeo Ohno, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/860,712

(22) Filed: Jan. 3, 2018

(65) Prior Publication Data
US 2018/0131754 A1 May 10, 2018

Related U.S. Application Data

(62) Division of application No. 14/391,169, filed as application No. PCT/JP2012/002471 on Apr. 9, 2012, now Pat. No. 9,882,962.

(51) Int. Cl.
*H04L 29/08* (2006.01)
*H04L 29/14* (2006.01)
*H04L 12/24* (2006.01)

(52) U.S. Cl.
CPC .............. *H04L 67/10* (2013.01); *H04L 41/12* (2013.01); *H04L 41/22* (2013.01); *H04L 69/40* (2013.01)

(58) Field of Classification Search
CPC ......... H04L 41/12; H04L 41/22; H04L 67/10; H04L 69/40
See application file for complete search history.

(56) References Cited

U.S. PATENT DOCUMENTS 6,608,635 B1 * 8/2003 Mumm ................... H04L 41/00
370/254
7,305,623 B2 * 12/2007 Despotidis .......... H04L 41/0806
715/734
(Continued)

FOREIGN PATENT DOCUMENTS

| EP | 0874497 | 10/1998 |
| JP | 2009-151509 | 7/2009 |

(Continued)

OTHER PUBLICATIONS

Nishihara et al., "New Cloud Networking Enabled by ProgrammableFlow", NEC Technical Journal, vol. 5 No. 2, 2010.*
(Continued)

*Primary Examiner* — Michael C Lai
(74) *Attorney, Agent, or Firm* — Sughrue Mion, PLLC

(57) ABSTRACT

A visualization device is communicable with one or a plurality of host servers for hosting a virtual system, and includes an information acquisition unit for collecting configuration information on the virtual system and the host server, a storage unit for storing the configuration information therein, and a drawing unit for expressing a virtual machine and a virtual network configuring the virtual system with different axes based on the configuration information stored in the storage unit, expressing a connection relationship between a virtual machine and a virtual network by linking the lines extending from the respective axes, and grouping virtual machines in units of server on which the virtual machines operate thereby to generate drawing information for expressing the configuration of the virtual system and the host server.

2 Claims, 11 Drawing Sheets

(56) References Cited

U.S. PATENT DOCUMENTS

| | | | | |
|---|---|---|---|---|
| 8,171,413 B2* | 5/2012 | McLaughlin | ..... | H04L 29/12933 715/734 |
| 2006/0125847 A1* | 6/2006 | Andreev | ................ | G06Q 40/00 345/629 |
| 2009/0249213 A1* | 10/2009 | Murase | .................... | H04L 41/12 715/735 |
| 2009/0292832 A1* | 11/2009 | Suzuki | .................. | H04L 41/142 710/18 |
| 2010/0161805 A1 | 6/2010 | Yoshizawa et al. | | |
| 2011/0022694 A1 | 1/2011 | Dalal | | |

FOREIGN PATENT DOCUMENTS

| | | |
|---|---|---|
| JP | 2009-282653 | 12/2009 |
| JP | 2010-146420 | 7/2010 |
| JP | 2011-517346 | 6/2011 |
| JP | 2011-232916 | 11/2011 |
| WO | WO 2015/130440 | 9/2015 |
| WO | WO-2015130440 A1 * | 9/2015 ................ H02J 4/00 |

OTHER PUBLICATIONS

Nishihara et al, "Cloud network by programmable flow", NEC Technical Journal, vol. 63 No. 2, (URL:http://www.hec.co.jp/techrep/ja/journal/g10/n02/100219.html).

International Search Report PCT/JP2012/002471 dated May 1, 2012.

European Extended Search Report dated Nov. 9, 2015; Application No. 12874347.3.

NEC: Programmable Flow Networking, 2011, XP002746512; Retrieved from the Internet: URL:http://www.nec.com/en/global/prod/pflow/images_documents/ProgrammableFlow_Brochure.pdf [retrieved on Oct. 13, 2015].

Nishihara et al., "New Cloud Networking Enabled by ProgrammableFlow", NEC Technical Journal, vol. 5 No. 2/2010, pp. 103-108.

* cited by examiner

| VIRTUAL MACHINE | HOST SERVER |
|---|---|
| VM1 | SV1 |
| VM2 | SV1 |
| VM3 | SV2 |
| VM4 | SV3 |
| VM5 | SV2 |
| VM6 | SV3 |

VISUALIZATION SYSTEM AND VISUALIZATION METHOD

U.S. application Ser. No. 15/860,712 is a Divisional of U.S. application Ser. No. 14/391,169, filed Oct. 10, 2014, now U.S. Pat. No. 9,882,962 which is a 371 of International PCT/JP2012/002471 dated Apr. 9, 2012.

TECHNICAL FIELD

The present invention relates to a visualization device, a visualization system, and a visualization method for visualizing system configuration information in an operation infrastructure of a virtual system.

BACKGROUND ART

A virtual technique for servers or networks is utilized in a network system for flexible configuration and easy management. With use of the virtual technique, resources such as servers or networks can be utilized without depending on the physical configuration. This is because the physical configuration is hidden against the higher orders in the visual technique, thereby freely using resources.

There is provided a technique which applies a switch network virtual technique for constructing a multi-tenant compatible cloud data center thereby to provide resources without any restriction on a server rack housing position also when a plurality of tenant users are to be housed (see NPL 1, for example).

CITATION LIST

Non Patent Literature

NPL 1: Nishihara and six others, "Cloud network by programmable flow", NEC Technical Journal, Vol. 63 No. 2

SUMMARY OF INVENTION

Technical Problem

In the virtual technique, the physical configuration is hidden against the higher orders and thus resources are not directly associated with physical resources. Therefore, it is important to accurately grasp the system configuration for operation management. For example, when a communication failure or the like occurs on a service provided in a virtual system, the entire system configuration including an association between the physical configuration and the logical configuration needs to be grasped in order to specify the location of failure.

NPL 1 discloses that a virtual view indicating a virtual system configuration called tenant is associated with the physical configuration indicating a hardware configuration in FIG. 7. The association diagram indicates the entire system configuration by linking virtual resources corresponding to the physical hardware by arrows. With the method, as the objects in the virtual system increase, the arrows for linking the objects and their corresponding physical configurations increase. Therefore, it is difficult to confirm associated resources at single glance due to overlapped or crossed lines when a large number of objects are generated.

As described above, the method for separately drawing the logical configuration and the physical configuration in the virtual system and indicating an association therebetween by arrows has a problem that the entire system configuration is difficult to grasp. In order to solve the problem, there is required a technique for automatically visualizing an association between the physical configuration and the logical configuration.

It is therefore an object of the present invention to provide a visualization device, a visualization system and a visualization method capable of easily visualizing an association between the logical configuration and the physical configuration in a virtual system.

Solution to Problem

A visualization device according to the present invention is communicable with one or a plurality of host servers for hosting a virtual system, and includes an information acquisition unit for collecting configuration information on the virtual system and the host server, a storage unit for storing the configuration information therein, and a drawing unit for expressing a virtual machine and a virtual network configuring the virtual system with different axes based on the configuration information stored in the storage unit, expressing a connection relationship between a virtual machine and a virtual network by linking the lines extending from the respective axes, and grouping virtual machines in units of server on which the virtual machines operate thereby to generate drawing information for expressing the configuration of the virtual system and the host server.

A visualization system according to the present invention includes one or a plurality of host servers for hosting a virtual system and a visualization device communicable with a display device, and the visualization device includes an information acquisition unit for collecting configuration information on the virtual system and the host server, a storage unit for storing the configuration information therein, and a drawing unit for expressing a virtual machine and a virtual network configuring the virtual system in a row or a column based on the configuration information stored in the storage unit, expressing a connection relationship between a virtual machine and a virtual network at a position where a column and a row cross with each other, grouping virtual machines in units of host server on which the virtual machines operate thereby to generate drawing information for expressing the configuration of the virtual system and the host server, and outputting the drawing information to the display device.

A visualization method according to the present invention is performed by a visualization device which is communicable with one or a plurality of host servers for hosting a virtual system, and includes the steps of collecting configuration information on the virtual system and the host server, and expressing the virtual machine and the virtual network in a row or a column based on the configuration information, expressing a connection relationship between the virtual machine and the virtual network at a position where a column and a row cross with each other, grouping virtual machines in units of host server on which the virtual machines operate, generating drawing information for expressing the configuration of the virtual system and the host server, and outputting the drawing information to a display device communicable with the visualization device.

Advantageous Effects of Invention

According to the present invention, it is possible to easily visualize an association between the logical configuration and the physical configuration in a virtual system. Further, logical resources corresponding to physical resources can be displayed in a screen, thereby confirming an association between the resources with less crossed lines also in a large-scaled system.

DESCRIPTION OF EMBODIMENTS

First Exemplary Embodiment

A first exemplary embodiment according to the present invention will be described below with reference to the drawings.

An information processing infrastructure visualization system (which will be simply denoted as visualization system below) according to the present invention includes a visualization device and an information processing infrastructure. The information processing infrastructure is configured of network devices such as switches and routers, and servers. The visualization device is communicably connected with each device configuring the information processing infrastructure.

Figure 1:
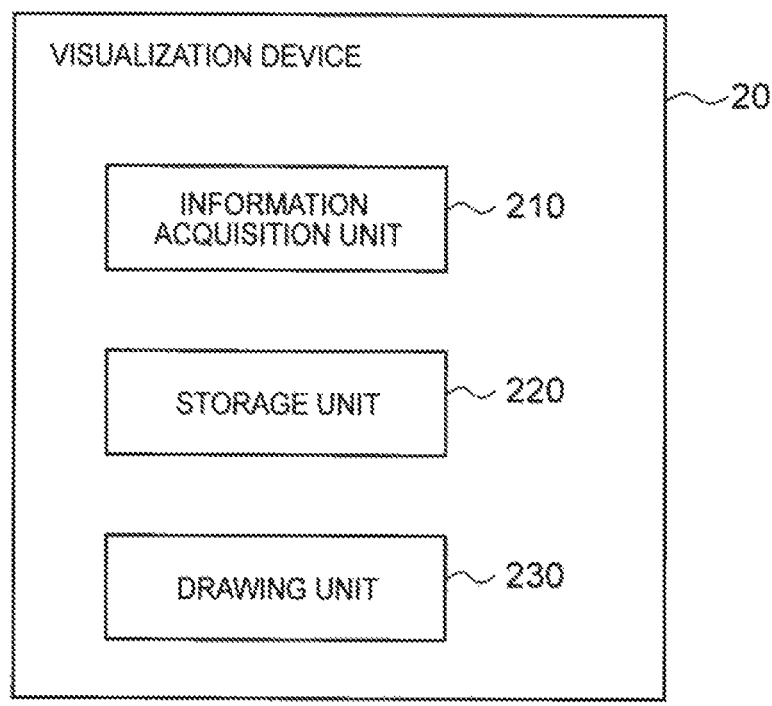
FIG. 1 It depicts a block diagram illustrating a structure of a visualization device according to a first exemplary embodiment.
Figure 2:
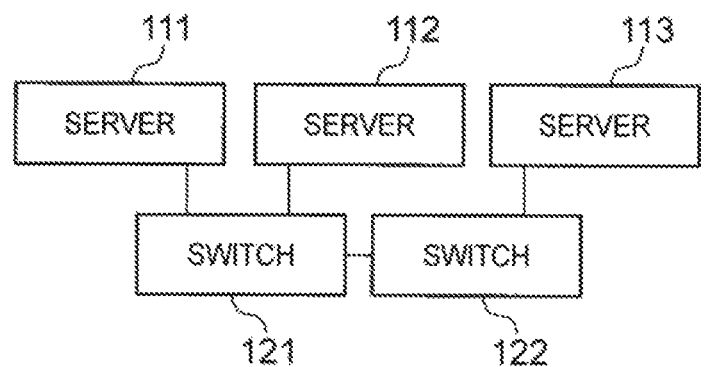
FIG. 2 It depicts a block diagram illustrating an exemplary structure of an information processing infrastructure.

FIG. 1 is a block diagram illustrating a structure of the visualization device according to the first exemplary embodiment. FIG. 2 is a block diagram illustrating an exemplary structure of the information processing infrastructure.

As illustrated in FIG. 1, a visualization device 20 includes an information acquisition unit 210, a storage unit 220 and a drawing unit 230.

The information acquisition unit 210 acquires information on a server or network device configuring the information processing infrastructure, or information set in the server or network device.

The storage unit 220 stores therein the information acquired by the information acquisition unit 210. The storage unit 220 is specifically realized by a storage device such as memory provided in the visualization device 20.

The drawing unit 230 generates drawing information for drawing an association between physical resources in the information processing infrastructure and the virtual systems operating on the information processing infrastructure based on the information stored in the storage unit 220.

The drawing unit 230 outputs the drawing information to a display unit in a display device such as a display communicable with the visualization device 20. The visualization device 20 may include a display device.

The information acquisition unit 210 and the drawing unit 230 are realized by the CPU provided in the visualization device 20.

FIG. 2 is a block diagram illustrating an exemplary structure of the information processing infrastructure.

The information processing infrastructure illustrated in FIG. 2 includes servers 111 to 113 (which will be denoted as servers SV1 to SV3 below) and switches 121 to 122 (which will be denoted as switches SW1 to SW2). The servers SV1 to SV3 and the switches SW1 to SW2 are communicably connected to each other. Specifically, the servers SV1 and SV2 are communicably connected with the switch SW1. The server SV3 is communicably connected with the switch SW2. The switch SW1 is communicably connected with the switch SW2. The information processing infrastructure may include other network device.

The information processing infrastructure has a virtual machine hosting function, and a virtual network configuration function by use of a technique such as ACL (Access Control List), VLAN (Virtual Local Area Network) and OpenFlow.

Figures 3, 4:
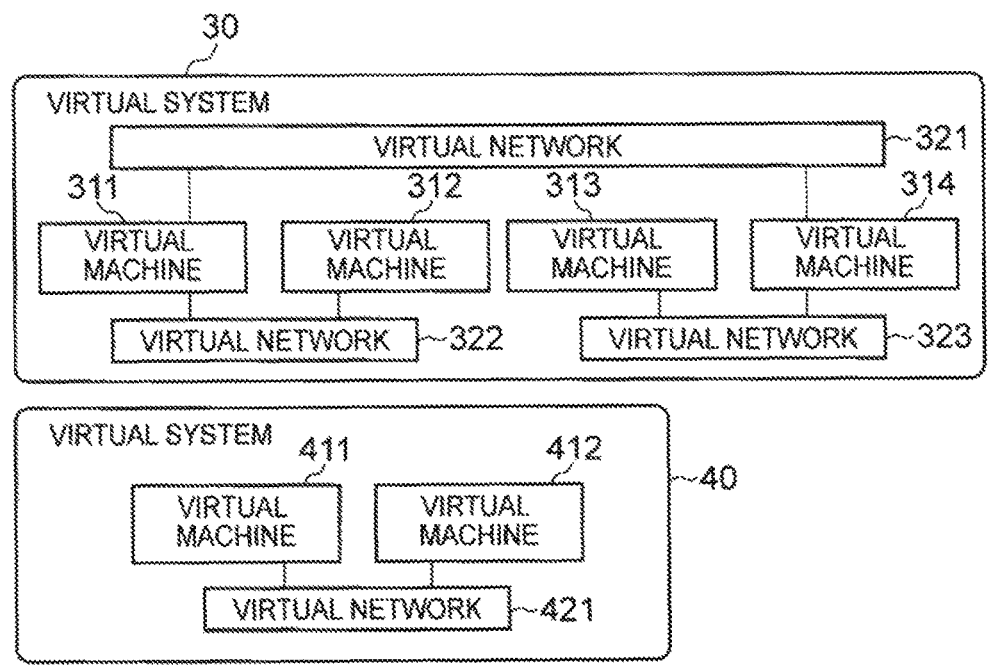
FIG. 3 It depicts a block diagram illustrating an exemplary structure of a virtual system operating on the information processing infrastructure.
FIG. 4 It depicts an explanatory diagram illustrating associations between virtual machines and host servers.

FIG. 3 is a block diagram illustrating an exemplary structure of the virtual systems operating on the information processing infrastructure. As illustrated in FIG. 3, in the present exemplary embodiment, two virtual systems 30 and 40 (which will be denoted as virtual systems VS1 and VS2 below, respectively) hosted by the host servers (servers SV1 to SV3) are configured.

The virtual system VS1 includes virtual machines 311 to 314 (which will be denoted as virtual machines VM1 to VM4 below) and virtual networks 321 to 323 (which will be denoted as virtual networks VN1 to VN3 below).

The virtual machine VM1 and the virtual machine VM2 are communicable to each other via the virtual network VN2. The virtual machine VM1 and the virtual machine VM4 are communicable to each other via the virtual network VN1. The virtual machine VM3 and the virtual machine VM4 are communicable to each other via the virtual network VN3.

The virtual system VS2 includes virtual machines 411 and 412 (which will be denoted as virtual machines VM5 and VM6, respectively, below), and a virtual network 421 (which will be denoted as virtual network VN4 below).

The virtual machine VM5 and the virtual machine VM6 are communicable to each other via the virtual network VN4.

FIG. 4 is an explanatory diagram illustrating the associations between the virtual machines and the host servers.

FIG. 4 illustrates which virtual machine is hosted by which host server. As illustrated in FIG. 4, according to the present exemplary embodiment, the virtual machines VM1 and VM2 are hosted on the server SV1. The virtual machines VM3 and VM5 are hosted on the server SV2. The virtual machines VM4 and VM6 are hosted on the server SV3.

The operations of the present exemplary embodiment will be described below.

A processing of visualizing the virtual systems VS1 and VS2 by the visualization device 20 (which will be denoted as visualization processing below) will be described herein.

Figure 5:
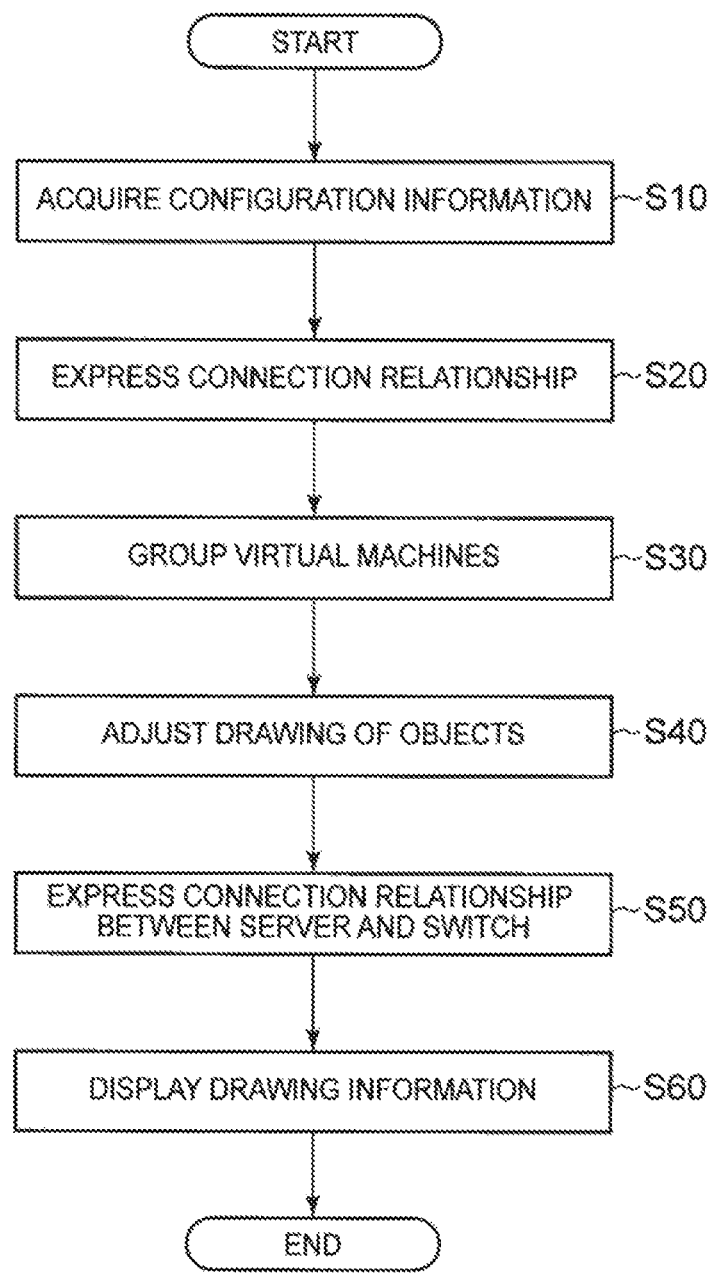
FIG. 5 It depicts a flowchart illustrating a drawing processing in the visualization device.

The drawing processing in the visualization processing will be first described. FIG. 5 is a flowchart illustrating the drawing processing in the visualization device.

The information acquisition unit 210 acquires configuration information on the information processing infrastructure and configuration information on the virtual systems operating on the information processing infrastructure (step S10). Specifically, the information acquisition unit 210 acquires information on a server for hosting a virtual machine, or network information such as MAC addresses and interface names of the virtual machines and the connection destination switches and port numbers of the connection destination switches. The information acquisition unit 210 acquires physical hardware connection information such as connection information on switches and routers or connection information on servers together with the network information. The information acquisition unit 210 stores the acquired information in the storage unit 220.

The drawing unit 230 generates a schematic diagram expressing a connection relationship between a virtual machine and a virtual network based on the information stored in the storage unit 220 (step S20). Specifically, the drawing unit 230 generates drawing information for displaying a schematic diagram on the display device. To generate a schematic diagram expressing a connection relationship may be simply denoted as "to express a connection relationship" below.

The schematic diagram expresses a connection relationship between virtual machines and virtual networks by expressing the virtual machines and the virtual networks by different axes such as a row and a column, and connecting straight lines at the positions where a row and a column cross with each other.

Figure 6:
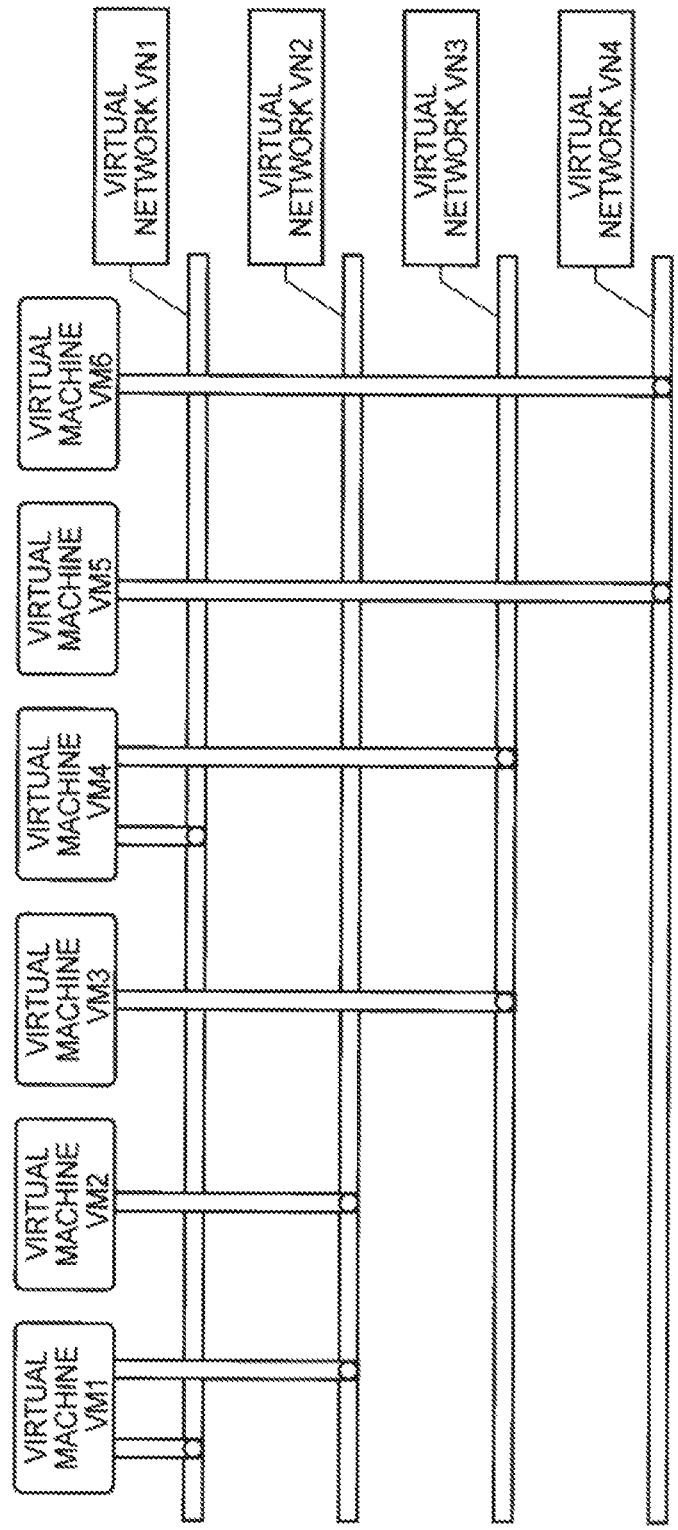
FIG. 6 It depicts a schematic diagram illustrating associations between virtual machines and virtual networks according to the first exemplary embodiment.

FIG. 6 is a schematic diagram illustrating the associations between the virtual machines and the virtual networks according to the first exemplary embodiment. As illustrated in FIG. 6, the drawing unit 230 expresses a connection relationship between the virtual machines and the virtual networks by connecting the lines extending from the respective axes with the virtual machines on the horizontal axis and the virtual networks on the vertical axis.

The schematic diagram illustrated in FIG. 6 illustrates that the virtual machines VM1 and VM4 are connected to the virtual network VN1. It further illustrates that the virtual machines VM1 and VM2 are connected to the virtual network VN2. It further illustrates that the virtual machines VM3 and VM4 are connected to the virtual network VN3. It further illustrates that the virtual machines VM5 and VM6 are connected to the virtual network VN4.

The drawing unit 230 associates the virtual systems with the host servers, and groups and arranges the virtual machines operating on the same host server (step S30).

Figure 7:
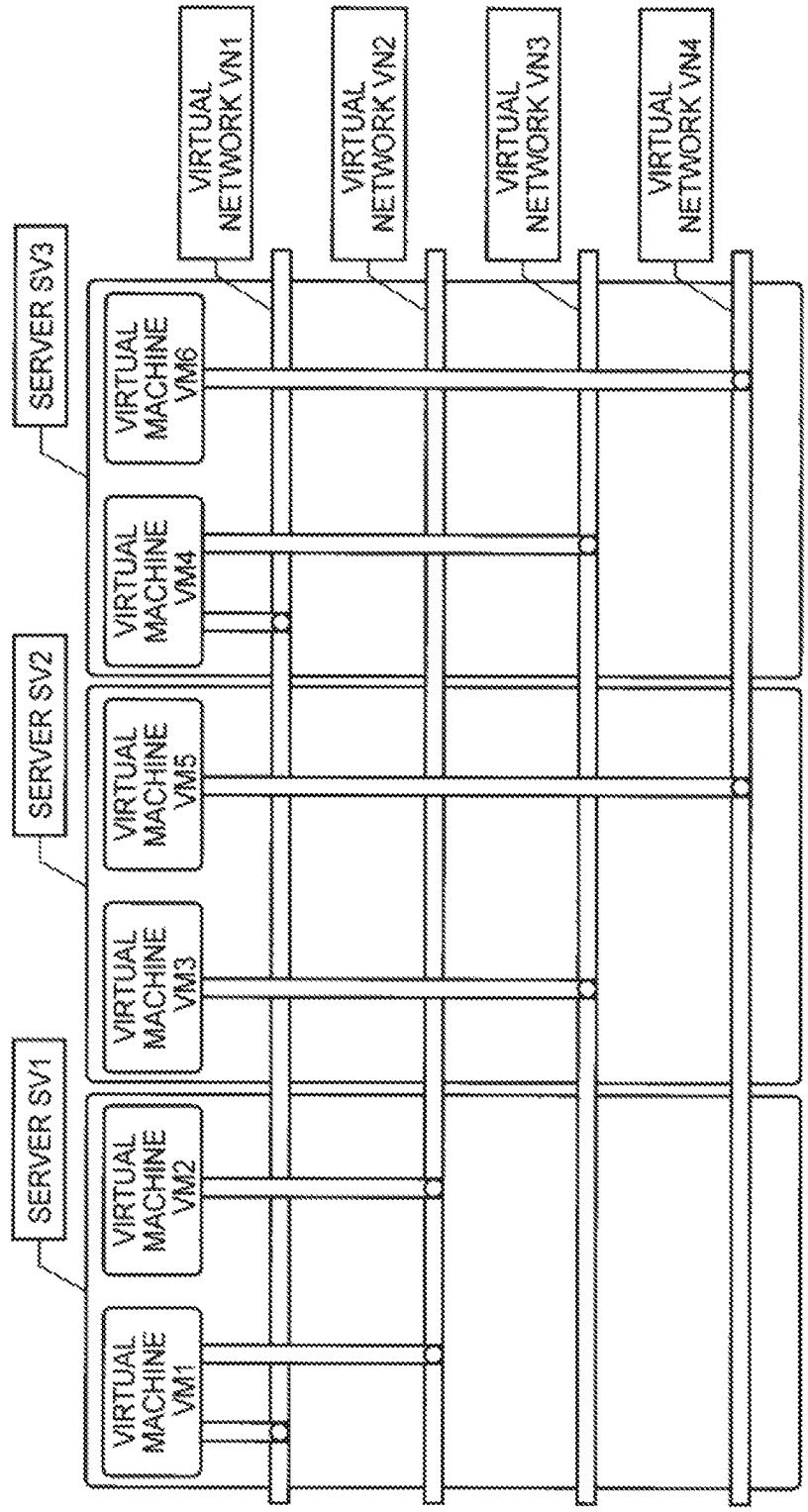
FIG. 7 It depicts a schematic diagram illustrating associations among virtual machines, virtual networks and host servers according to the first exemplary embodiment.

FIG. 7 is a schematic diagram illustrating the associations among the virtual machines, the virtual networks and the host servers according to the first exemplary embodiment. Specifically, the virtual machines are grouped in units of host server in the schematic diagram. In FIG. 7, the virtual machines VM1 and VM4 operating on the server SV1, the virtual machines VM3 and VM5 operating on the server SV2, and the virtual machines VM4 and VM6 operating on the server SV3 are arranged in order of server.

The drawing unit 230 adjusts the drawing of objects for reducing crossed lines or excess lines in order to enhance browsability of the schematic diagram (step S40). For example, the drawing unit 230 changes the position where the virtual machines are displayed below or between the virtual networks connecting the virtual machines. The drawing unit 230 adjusts the line indicating the virtual network to a required minimum length, thereby reducing the number of excess crosses with the unconnected virtual networks.

Figure 8:
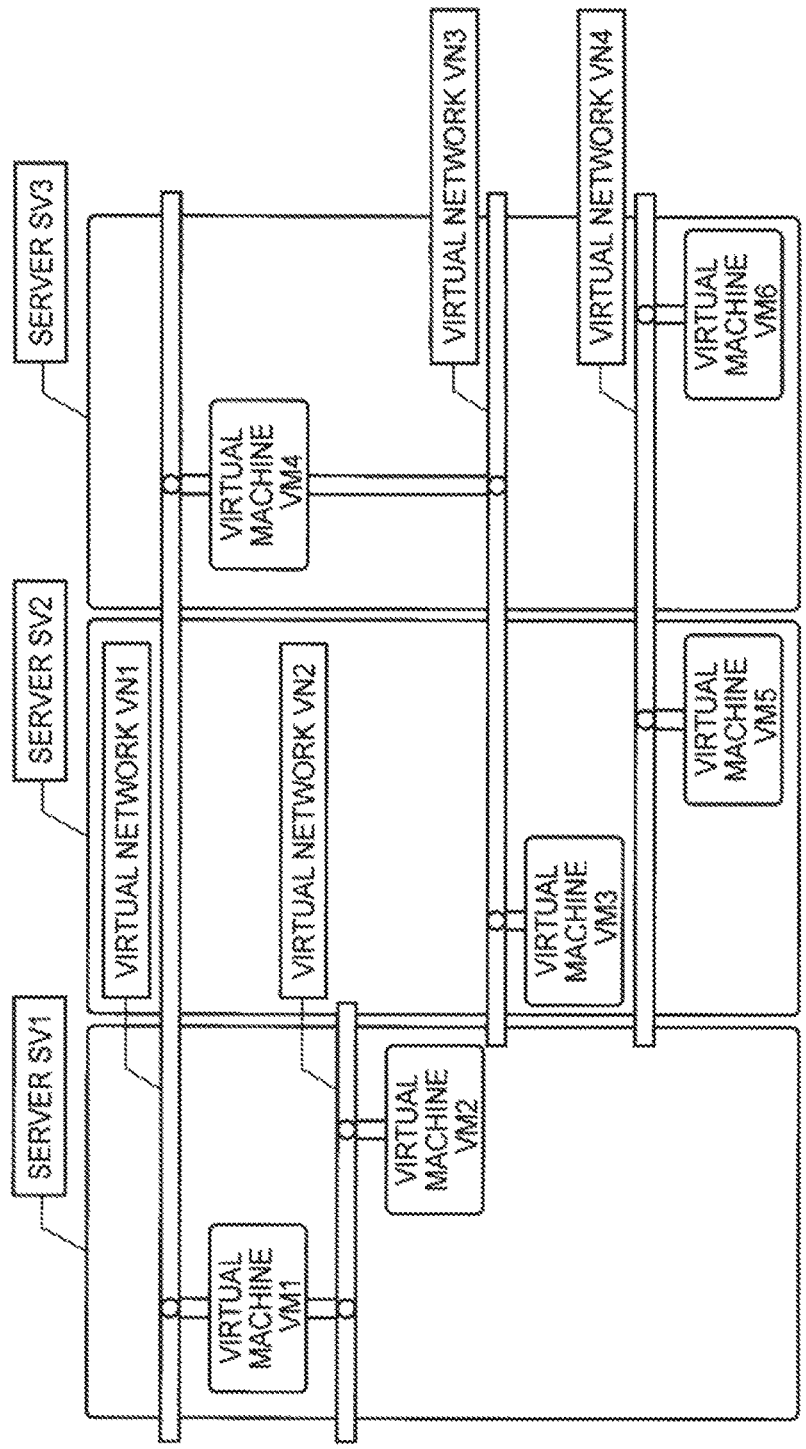
FIG. 8 It depicts a schematic diagram illustrating associations among virtual machines, virtual networks and host servers according to the first exemplary embodiment.

FIG. 8 is a schematic diagram illustrating the associations among the virtual machines, the virtual networks and the host servers according to the first exemplary embodiment. Specifically, the schematic diagram illustrates that the drawing of objects is already adjusted. As illustrated in FIG. 8, the position of the virtual machine VM1 is moved below the virtual network VN1, and thus the line connecting the virtual machine VM1 and the virtual network VN2 does not cross with the virtual network VN1. This is applicable to the virtual machines VM2 to VM6.

The line indicating the virtual network VN2 is adjusted to only connect the virtual machines VM1 and VM2 thereby to reduce an excess width, and thus the virtual network VN2 and the virtual machine VM4 can avoid from being crossed. That is, the number of crossed lines can be reduced.

The drawing unit 230 links the lines extended from the respective axes with the servers and the switches on different axes, thereby expressing a connection relationship between the servers and the switches (step S50).

Figure 9:
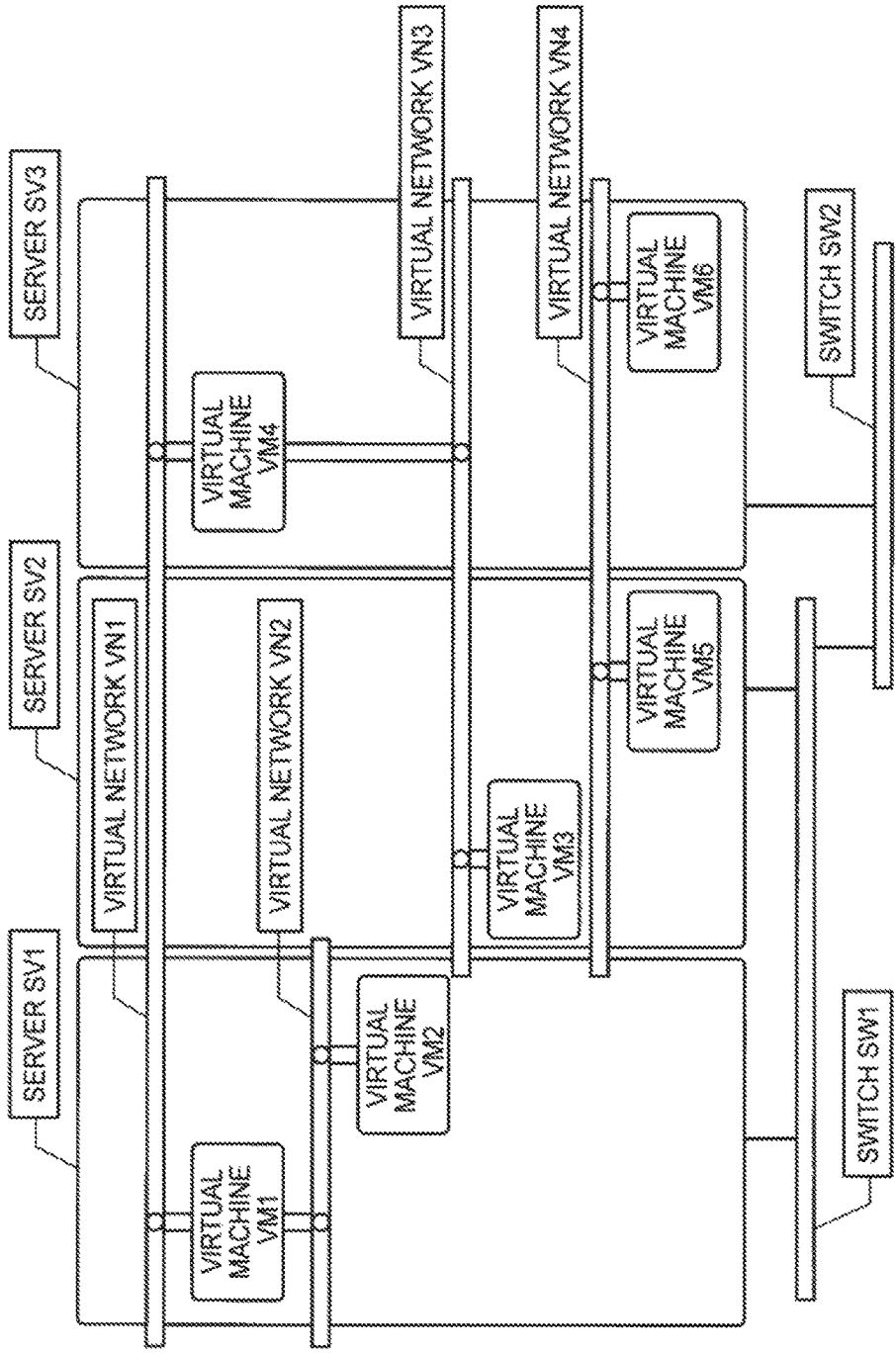
FIG. 9 It depicts a schematic diagram illustrating associations among virtual machines, virtual networks, host servers and switches according to the first exemplary embodiment.

FIG. 9 is a schematic diagram illustrating the associations among the virtual machines, the virtual networks, the host servers and the switches according to the first exemplary embodiment. As illustrated in FIG. 9, the drawing unit 230 expresses a connection relationship between the servers and the switches by linking the lines extending from the respective axes with the servers on the horizontal axis and the switches on the vertical axis.

The schematic diagram illustrated in FIG. 9 indicates that the servers SV1 and SV2 are connected to the switch SW1. It further indicates that the server SV3 is connected to the switch SW2.

The drawing unit 230 outputs the drawing information generated in steps S20 to S50 to the display device (step S60).

Figure 10:
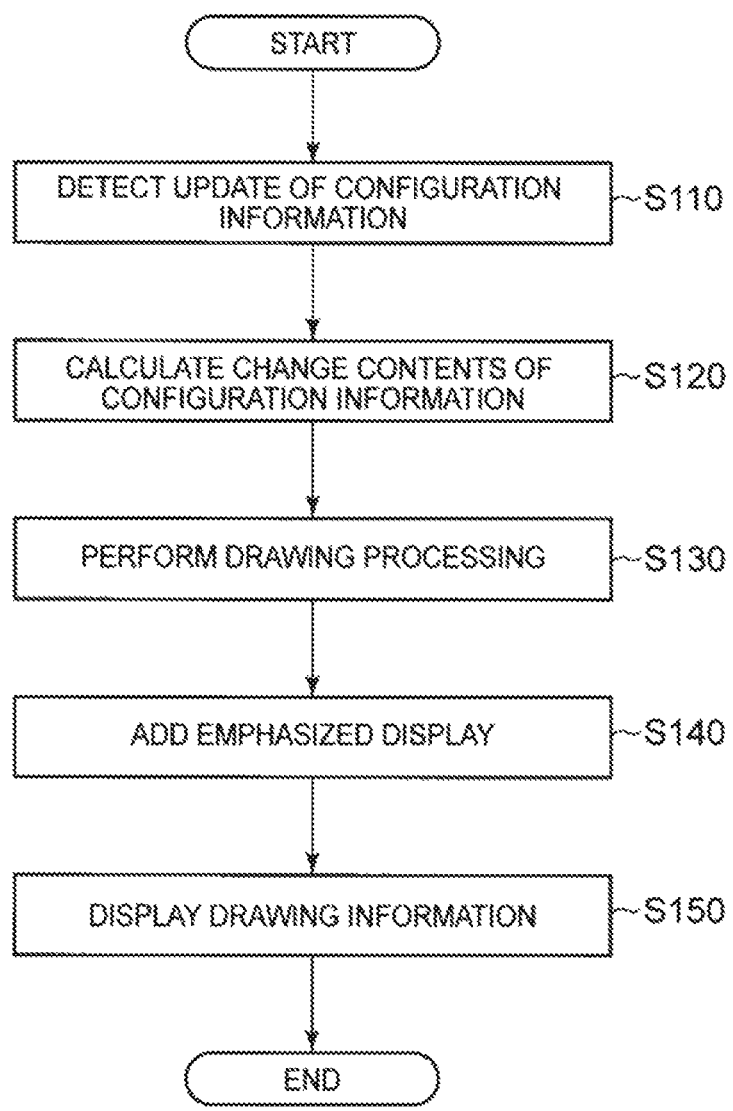
FIG. 10 It depicts a flowchart illustrating a re-drawing processing in the visualization device.

A re-drawing processing when the visualization device 20 detects a change in the structure of the virtual system will be described below. FIG. 10 is a flowchart illustrating the re-drawing processing in the visualization device.

The information acquisition unit 210 detects that the configuration information on the information processing infrastructure or the configuration information on the virtual system operating on the information processing infrastructure is updated. Then, the drawing unit 230 starts the re-drawing processing (step S110).

The drawing unit 230 calculates the change contents of the configuration information based on the previous configuration information and the latest configuration information stored in the storage unit 220 (step S120).

The drawing unit 230 performs the same drawing processing as in steps S20 to S50 based on the change contents of the configuration information, and reflects the change in the configuration information on the schematic diagram (step S130).

The drawing unit 230 adds, to the drawing information, information for emphasizing and displaying an object such as a connection point with an added or changed virtual machine or virtual network (step S140). The drawing unit 230 adds information for blinking and changing a color of the object certain times or in a certain period of time in order to make it easy to perceive the added or changed object.

The drawing unit 230 outputs the drawing information generated in steps S110 to S140 to the display device (step S150).

The schematic diagram is not limited to the forms illustrated in FIG. 6 to FIG. 9, and may be other form.

As described above, according to the present exemplary embodiment, the visualization device expresses the virtual machines or servers and the virtual networks or switches on different axes and expresses a connection relationship by linking the lines extending from the respective axes. Thus, even when the number of virtual machines or servers or the number of virtual networks or switches increases, each axis is extended thereby to easily express a connection relationship. Therefore, according to the present exemplary embodiment, the virtual systems operating on the servers and the network configuration of the virtual systems can be expressed within one screen (schematic diagram) in association with the physical configuration. The drawing information is output to the display device thereby to easily present the network configuration of the virtual systems to the user. Therefore, the operation management of the virtual systems operating on the information processing infrastructure can be made efficient.

According to the present exemplary embodiment, the visualization device groups the virtual machines in units of server, and adjusts the drawing of objects. Thus, the number of excess crossed lines in the schematic diagram can be reduced and the system configuration can be illustrated in a simplified manner. Therefore, according to the present exemplary embodiment, the required system configuration can be easily presented to the user even in a large-scaled virtual system.

Second Exemplary Embodiment

A second exemplary embodiment according to the present invention will be described below with reference to the drawings.

A structure of a visualization system according to the present exemplary embodiment is the same as that of the first exemplary embodiment and thus an explanation thereof will be omitted.

The drawing unit 230 in the visualization device 20 has a function of displaying only a summary for a user-designated node or a node automatically selected by the visualization system.

The operations of the present exemplary embodiment will be described below.

Figure 11:
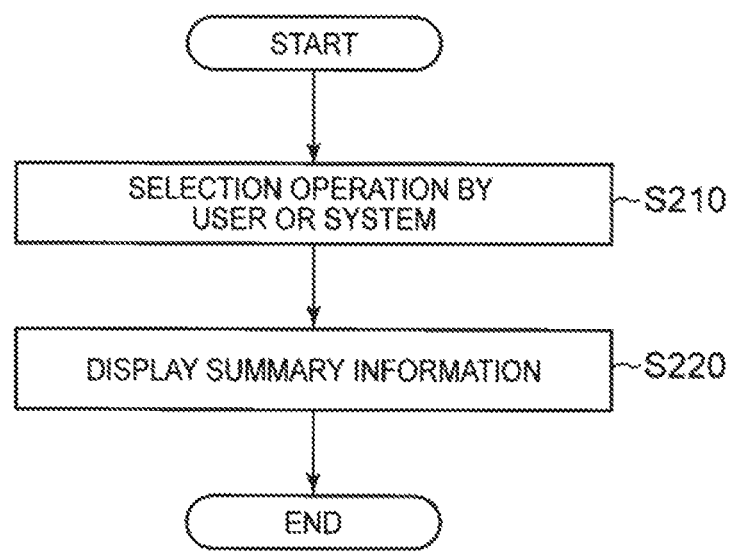
FIG. 11 It depicts a flowchart illustrating a summary processing in the visualization device.

A summary processing in the drawing unit 230 will be described herein. FIG. 11 is a flowchart illustrating the summary processing in the visualization device.

The user performs an operations such as mouseover, clicking or pulling-down or operates a check box thereby to select a virtual machine or server, or a virtual network or virtual system from the schematic diagram displayed in the display device (step S210). The selection operation may be automatically performed by the visualization system not by the user. For example, when the information acquisition unit 210 in the visualization device detects a change in the configuration, a newly-added virtual machine or server, or virtual network or virtual system may be selected.

The drawing unit 230 displays only the summary information for the server or network selected in step S210, and omits the display of the detailed configuration (step S220). For example, the drawing unit 230 displays the detailed configuration in a folded manner. The display of a server or network unselected in step S210 may be omitted.

In step S220, when only the summary of the server information is displayed, only the information on a virtual machine is displayed as a representative one of the virtual machines included in the server. The connection information on all the virtual machines included in the server may be integrated and drawn as a pseudo node.

Figure 12:
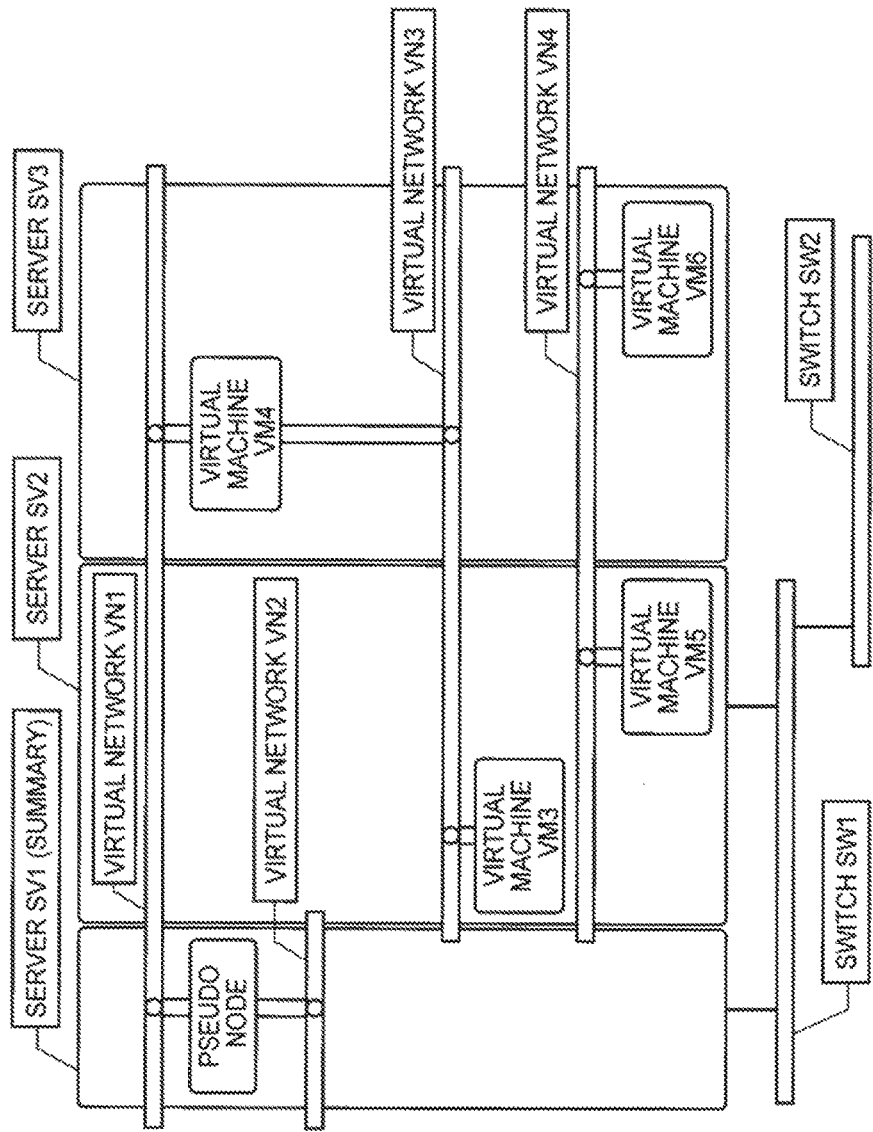
FIG. 12 It depicts an explanatory diagram illustrating an exemplary summary processing result of server information.
Figure 13:
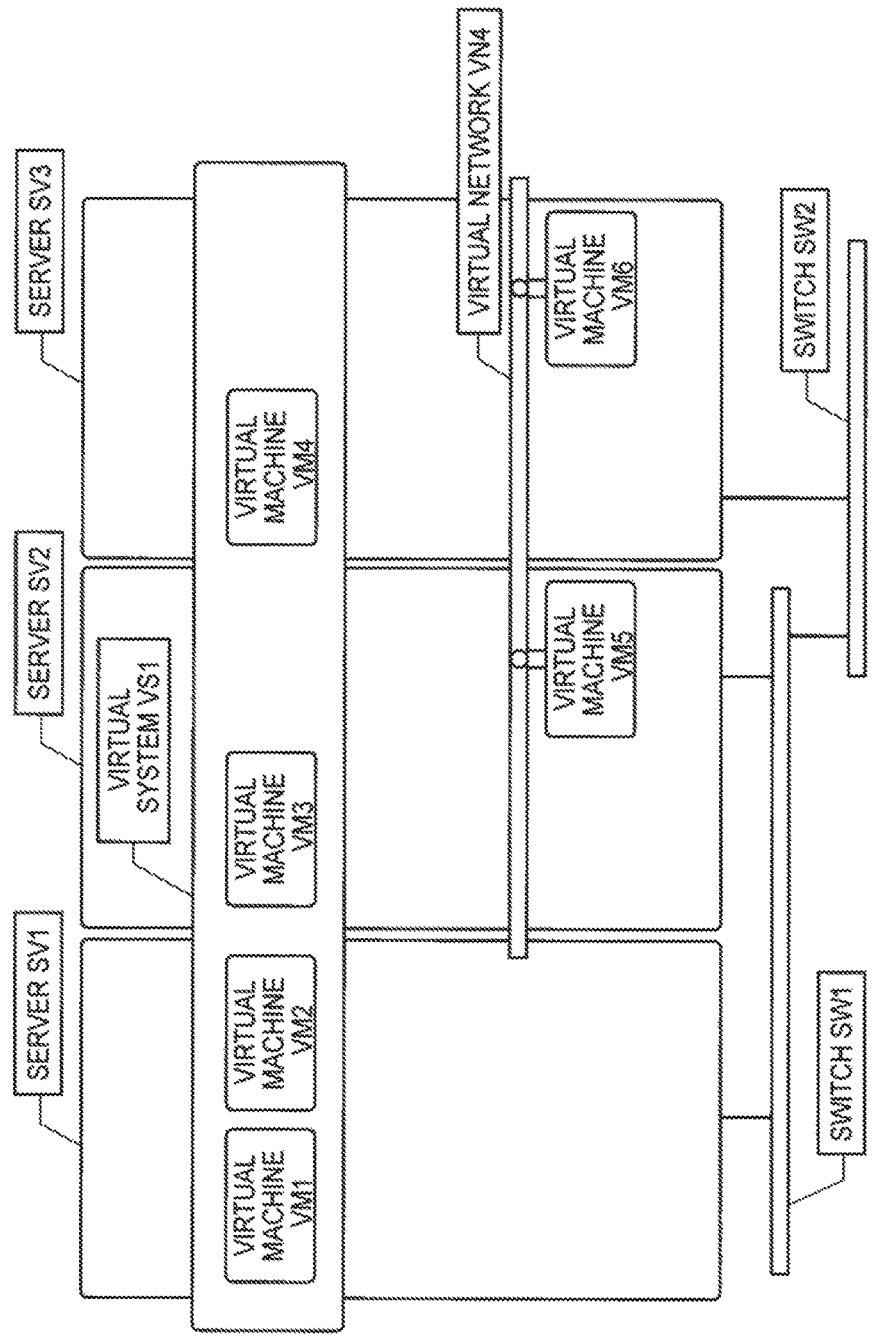
FIG. 13 It depicts an explanatory diagram illustrating an exemplary summary processing result of virtual system information.

FIG. 12 is an explanatory diagram illustrating an exemplary summary processing result of the server information. FIG. 13 is an explanatory diagram illustrating an exemplary summary processing result of the virtual system information.

When the user or the visualization system selects the server SV1, the detailed configuration of the server SV1 is folded and only the summary information is displayed as illustrated in FIG. 12. In FIG. 12, the information on the virtual machine VM1 and the virtual machine VM2 is summarized and only the information on a pseudo node is displayed.

When the user or the visualization system selects a virtual network or virtual system, the virtual system to which the selected virtual network belongs is displayed in units of virtual system, or is summarized and displayed in units of selected virtual system. For example, when any of the virtual networks VN1 to VN3 or the virtual system VS1 is selected, the detailed configuration of the virtual system VS1 is folded and only the summary information is displayed as illustrated in FIG. 13. In FIG. 13, the information belonging to the virtual system VS1 is summarized and only the information on the virtual systems VM1 to VM4 is displayed.

The schematic diagram is not limited to the forms illustrated in FIG. 12 and FIG. 13, and may be other form.

As described above, according to the present exemplary embodiment, only the summary information is displayed for a virtual machine or server, or a virtual network or virtual system selected by the user or the like. Therefore, according to the present exemplary embodiment, even when more virtual machines or virtual systems are configured, trivial information can be omitted. Thus, information on a part of interest remains while the entire system configuration can be presented to the user.

REFERENCE SIGNS LIST

20 Visualization device
30, 40 Virtual system
111, 112, 113 Server
121, 122 Switch
210 Information acquisition unit
220 Storage unit
230 Drawing unit
311, 312, 313, 314, 411, 412 Virtual machine
321, 322, 323, 421 Virtual network

The invention claimed is:

1. A visualization system comprising;
a processor configured to:
read, from a memory, configuration information on a first virtual machine and a first virtual network; and,
display on a display, based on the configuration information:

a first image, representing the first virtual machine, in a first area representing a first server, wherein the first server hosts the first virtual machine;

a second image, representing a second virtual machine, in a second area representing a second server, wherein the second server hosts the second virtual machine;

a first line, representing a first virtual network, wherein the first virtual network corresponds to communication between the first virtual machine and the second virtual machine, a first object at an intersection between a second line and the first line, wherein the second line is between the first image and the first line, a second object at an intersection between a third line and the first line, wherein the third line is between the second image and the first line, and a fourth line between a third image, representing a switch, and the first area, and a fifth line between the third image and the second area, wherein the first object and the second object indicate that the first virtual machine is capable of communicating with the second virtual machine through the first virtual network, the fourth line indicates that the switch is capable of communicating with the first server, and the fifth line indicates a pathway by which the switch is capable of communication with the second server.

2. A visualization method comprising:

obtaining, from a memory, configuration information on a first virtual machine and a first virtual network; and displaying on a display, based on the configuration information:

a first image, representing the first virtual machine, in a first area representing a first server, wherein the first server hosts the first virtual machine;

a second image, representing a second virtual machine, in a second area representing a second server, wherein the second server hosts the second virtual machine;

a first line, representing a first virtual network, wherein the first virtual network corresponds to communication between the first virtual machine and the second virtual machine, a first object at an intersection between a second line and the first line, wherein the second line is between the first image and the first line, a second object at an intersection between a third line and the first line, wherein the third line is between the second image and the first line, and a fourth line between a third image, representing a switch, and the first area, and a fifth line between the third image and the second area, wherein the first object and the second object indicate that the first virtual machine is capable of communicating with the second virtual machine through the first virtual network, the fourth line indicates that the switch is capable of communicating with the first server, and the fifth line indicates a pathway by which the switch is capable of communication with the second server.

* * * * *